(12) United States Patent
Sung (10) Patent No.: US 12,143,940 B2
(45) Date of Patent: Nov. 12, 2024

(54) MASSIVE MIMO BEAMFORMING MODE CONTROL TO COMBAT REMOTE INTERFERENCE DUE TO TROPOSPHERIC DUCTING

(71) Applicant: T-Mobile Innovations LLC, Overland Park, KS (US)

(72) Inventor: Sanghoon Sung, Ashburn, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 322 days.

(21) Appl. No.: 17/566,042

(22) Filed: Dec. 30, 2021

(65) Prior Publication Data

US 2023/0217375 A1  Jul. 6, 2023

(51) Int. Cl.
*H04W 52/24* (2009.01)
*H04B 7/06* (2006.01)

(52) U.S. Cl.
CPC ........ *H04W 52/243* (2013.01); *H04B 7/0617* (2013.01)

(58) Field of Classification Search
CPC ..... H04W 52/04; H04W 52/06; H04W 52/08; H04W 52/18; H04W 52/24; H04W 52/241; H04W 52/243; H04W 52/245; H04W 52/248; H04B 7/005; H04B 7/0413; H04B 7/0417; H04B 7/0617; H04B 7/0619; H04B 7/22; H04B 7/24
See application file for complete search history.

(56) References Cited

U.S. PATENT DOCUMENTS

| | | | |
|---|---|---|---|
| 6,304,760 B1 | 10/2001 | Thomson et al. | |
| 7,209,760 B2 * | 4/2007 | Kochanski | H04W 52/24 455/67.11 |
| 10,034,181 B1 * | 7/2018 | Somashekar | H04W 24/02 |
| 2014/0056190 A1 * | 2/2014 | Qian | H04B 7/2656 370/280 |
| 2021/0306878 A1 * | 9/2021 | Jin | H04W 24/04 |

OTHER PUBLICATIONS

Elena Peralta et al., "Remote interference management in 5G new radio: methods and performance", EURASIP Journal on Wireless Communications and Networking, Article 45, Mar. 2021, 22 pages.
Ergin Dine et al., "Limited Feedback Multi-stage Beam-forming Method for Beyond-Line-of-Sight Ducting Channels", MILCOM 2015, Oct. 2015, 6 pages.

* cited by examiner

*Primary Examiner* — Quochien B Vuong
(74) *Attorney, Agent, or Firm* — Shook, Hardy & Bacon L.L.P.; Elena K. McFarland (57) ABSTRACT

Systems and methods provided for controlling a signal power level of a beam at a cell site of a telecommunications network during an atmospheric condition include a user device and a cell site. The cell site includes a beam control system communicatively coupled to the user device. The beam control system is to determine whether a rise of interference is greater than a threshold during an atmospheric condition, determine a power increase status of the directional signal if the rise of interference is greater than the threshold, generate a secondary signal power level based on an increase of a first signal power level in response to the power increase status of the directional signal associated with an active state, and determine whether the secondary signal power level of the directional signal is greater than a target signal power level.

20 Claims, 5 Drawing Sheets

MASSIVE MIMO BEAMFORMING MODE CONTROL TO COMBAT REMOTE INTERFERENCE DUE TO TROPOSPHERIC DUCTING

SUMMARY

The present disclosure is directed, in part, to controlling a signal power level of a beam at a cell site of a telecommunications network during an atmospheric condition, substantially as shown in and/or described in connection with at least one of the figures, and as set forth more completely in the claims.

In aspects set forth herein, a beam is emitted from an antenna at a cell site. A signal is then spread in all directions from the antenna. Typically, during a tropospheric duct, signals that enter the duct travel hundreds of kilometers with low propagation losses and cause interference at a distance from the transmitter. However, here, whether a rise of interference is greater than a threshold is determined during an atmospheric condition. The signal power level of a beam at the cell site is controlled which reduces performance degradation due to propagation inefficiencies.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of embodiments of the invention is described with specificity herein to meet statutory requirements. However, the description itself is not intended to limit the scope of this patent. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

In certain aspects, methods are provided for controlling a signal power level of a beam at a cell site of a telecommunications network (e.g., a 5G network or any other suitable network) during an atmospheric condition. Whether a rise of interference is greater than a threshold is determined during the atmospheric condition. A directional signal travels between one or more cell sites during the atmospheric condition. A power increase status of the directional signal is determined if the rise of interference is greater than the threshold. A secondary signal power level is generated based on an increase of a first signal power level in response to the power increase status of the directional signal associated with an active state. Whether the secondary signal power level of the directional signal is greater than a target signal power level is determined. One or more time periods are activated if the secondary signal power level of the directional signal is greater than the target signal power level.

Advantageously, providing methods and systems for controlling a signal power level of a beam at a cell site of a telecommunications network during an atmospheric condition reduces beamforming (e.g., channel reciprocity-based beamforming) performance degradation caused by interference.

In one aspect, a method is provided for controlling a signal power level of a beam at a cell site of a telecommunications network during an atmospheric condition. The method includes determining, by a beam control system communicatively coupled to one or more user devices, whether a rise of interference is greater than a threshold during an atmospheric condition, wherein a directional signal travels between one or more cell sites during the atmospheric condition. The method also includes determining a power increase status of the directional signal if the rise of interference is greater than the threshold. The method also includes generating a secondary signal power level based on an increase of a first signal power level in response to the power increase status of the directional signal associated with an active state. The method further includes determining whether the secondary signal power level of the directional signal is greater than a target signal power level. The method further includes activating one or more time periods if the secondary signal power level of the directional signal is greater than the target signal power level.

In another aspect, a computer-readable storage media having computer-executable instructions embodied thereon is provided that, when executed by one or more processors, cause the processors to perform various steps. The processors are caused to determine, by a beam control system communicatively coupled to one or more user devices, whether a rise of interference is greater than a threshold during an atmospheric condition, wherein a directional signal travels between one or more cell sites during the atmospheric condition. The processors are also caused to determine a power increase status of the directional signal if the rise of interference is greater than the threshold. The processors are also caused to generate a secondary signal power level based on an increase of a first signal power level in response to the power increase status of the directional signal associated with an active state, wherein the first signal power level or the secondary signal power level includes at least one of a calibration signal power level or a Sounding Reference Signal (SRS) power level. The processors are also caused to determine whether the secondary signal power level of the directional signal is greater than a target signal power level. The processors are further caused to activate one or more time periods if the secondary signal power level of the directional signal is greater than the target signal power level.

In yet another aspect, a system is provided for controlling a signal power level of a beam at a cell site of a telecommunications network during an atmospheric condition. The system includes a user device and a cell site comprising a beam control system communicatively coupled to the user device. The beam control system determines whether a rise of interference is greater than a threshold during an atmospheric condition, wherein a directional signal travels between one or more cell sites during the atmospheric condition. The beam control system also determines a power increase status of the directional signal if the rise of interference is greater than the threshold. The beam control system also generates a secondary signal power level based on an increase of a first signal power level in response to the power increase status of the directional signal associated with an active state. The beam control system also determines whether the secondary signal power level of the directional signal is greater than a target signal power level. The beam control system further activates one or more time periods if the secondary signal power level of the directional signal is greater than the target signal power level.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of aspects herein.

Embodiments herein may be embodied as, among other things: a method, system, or set of instructions embodied on one or more computer-readable media. Computer-readable media include both volatile and nonvolatile media, removable and non-removable media, non-transitory and/or transitory media, and contemplate media readable by a database, a switch, and various other network devices. Computer-readable media includes media implemented in any way for storing information. Examples of stored information include computer-useable instructions, data structures, program circuitry, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer-program product that includes computer-useable or computer-executable instructions embodied on one or more computer-readable media.

"Computer-readable media" may be any available media and may include volatile and nonvolatile media, as well as removable and non-removable media. By way of example, and not limitation, computer-readable media may include computer-readable storage media and communication media.

"Computer-readable storage media" may include, without limitation, volatile and nonvolatile media, as well as removable and non-removable media, implemented in any method or technology for storage of information, such as computer-readable instructions, data structures, program circuitry, or other data. In this regard, computer-readable storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage devices, or any other medium which may be used to store the desired information and which may be accessed by the computing device 400 shown in FIG. 4. Computer-readable storage media does not comprise a signal per se.

"Communication media" may include, without limitation, computer-readable instructions, data structures, program circuitry, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

A "network" refers to a network comprised of wireless and wired components that provide wireless communications service coverage to one or more UE. The network may comprise one or more base stations, one or more cell sites (i.e., managed by a base station), one or more cell towers (i.e., having an antenna) associated with each base station or cell site, a gateway, a backhaul server that connects two or more base stations, a database, a power supply, sensors, and other components not discussed herein, in various embodiments.

The terms "base station" and "cell site" may be used interchangeably herein to refer to a defined wireless communications coverage area (i.e., a geographic area) serviced by a base station. It will be understood that one base station may control one cell site or alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

An "access point" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO) as discussed hereinafter.

The terms "user equipment," "UE," and "user device" are used interchangeably to refer to a device employed by an end-user that communicates using a network. UE generally includes one or more antenna coupled to a radio for exchanging (e.g., transmitting and receiving) transmissions with a nearby base station, via an antenna array of the base station. In embodiments, UE may take on any variety of devices, such as a personal computer, a laptop computer, a tablet, a netbook, a mobile phone, a smart phone, a personal digital assistant, a wearable device, a fitness tracker, or any other device capable of communicating using one or more resources of the network. UE may include components such as software and hardware, a processor, a memory, a display component, a power supply or power source, a speaker, a touch-input component, a keyboard, and the like. In embodiments, some of the UE discussed herein may include current UE capable of using 5G and having backward compatibility with prior access technologies, current UE capable of using 5G and lacking backward compatibility with prior access technologies, and legacy UE that is not capable of using 5G.

The terms "radio," "controller," "antenna," and "antenna array" are used interchangeably to refer to one or more software and hardware components that facilitate sending and receiving wireless radio-frequency signals, for example, based on instructions from a base station. A radio may be used to initiate and generate information that is then sent out through the antenna array, for example, where the radio and antenna array may be connected by one or more physical paths. Generally an antenna array comprises a plurality of individual antenna elements. The antennas discussed herein may be dipole antennas, having a length, for example, of ¼, ½, 1, or 1 ½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via FD-MIMO, Massive MIMO, 3G, 4G, 5G, and/or 802.11 protocols and techniques.

Additionally, it will be understood that terms such as "first," "second," and "third" are used herein for the purposes of clarity in distinguishing between elements or features, but the terms are not used herein to import, imply, or otherwise limit the relevance, importance, quantity, technological functions, sequence, order, and/or operations of any element or feature unless specifically and explicitly stated as such.

Figure 1:
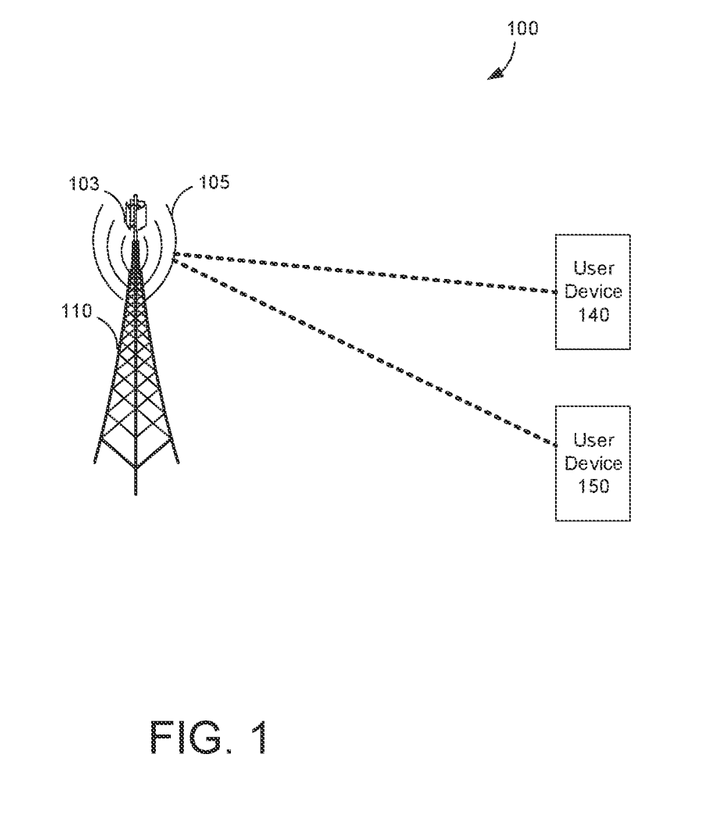
FIG. 1 depicts an example of a network environment in accordance with one or more embodiments.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

The network environment 100 provides service to one or more user devices 140 and 150. In some embodiments, the network environment 100 may be a telecommunication network (e.g., a telecommunication network such as, but not limited to, a wireless telecommunication network), or portion thereof. The network environment 100 may include one or more devices and components, such as base stations, servers, switches, relays, amplifiers, databases, nodes, etc. which are not shown so as to not confuse other aspects of the present disclosure. Those devices and components may provide connectivity in a variety of implementations. In addition the network environment 100 may be utilized in a variety of manners, such as a single network, multiple networks, or as a network of networks, but, ultimately, is shown as simplified as possible to avoid the risk of confusing other aspects of the present disclosure.

The network environment 100 may include or otherwise may be accessible through a cell site 110. In some embodiments, the cell site 110 may take the form or an aggressor cell site (e.g., a first cell site that emits a beam received at a victim cell site such as, but not limited to, a secondary cell site). The cell site 110 may include one or more antennas 103, base transmitter stations, radios, transmitter/receivers, digital signal processors, control electronics, GPS equipment, power cabinets or power supply, base stations, charging stations, etc. such that the cell site 110 may provide a communication link between the one or more user devices 140 and 150 and other components, systems, equipment, and/or devices of the network environment 100. The base station and/or a computing device (e.g., whether local or remote) associated with the base station may manage or otherwise control the operations of components of the cell site 110.

The one or more antennas 103 may emit a beam 105 that may cover a geographic area. The one or more antennas 103 are capable of using beamforming as at least one signal processing operation (e.g., technique). The beam 105 is operable in one or more beam modes.

In a stand-alone mode, the network environment 100 may take the form of a 5G network or any other suitable network. In some embodiments, the cell site 110 may be operable in a non-stand alone mode. In the non-stand alone (NSA) mode, the network environment 100 may take the form of, for example, an E-UTRAN New Radio-Dual Connectivity (EN-DC) network. In an EN-DC network, a user device (e.g., the user device 140 and/or 150) may connect to or otherwise access a 4G, LTE, 5G, 5G NR, or any other suitable network simultaneously.

Figure 2A:
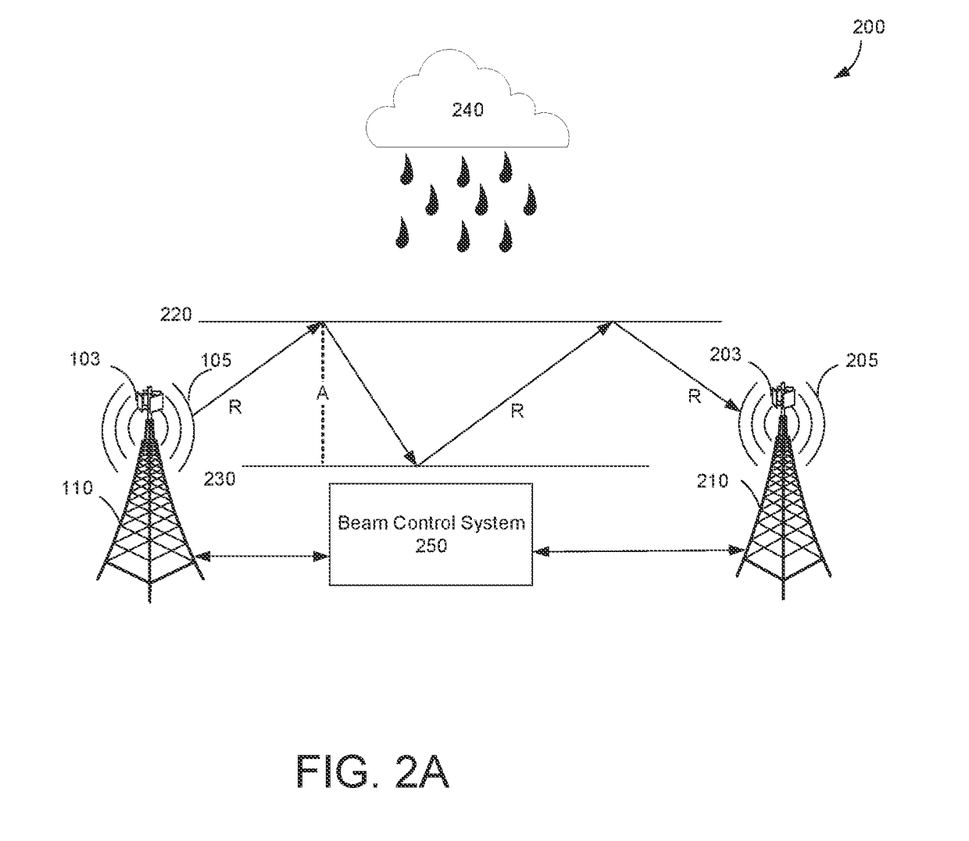
FIG. 2A is a diagram of a network environment including a plurality of cell sites and a beam control system in accordance with an example embodiment.

In some embodiments, the network environment 100 may include a beam control system (e.g., the beam control system 250 as illustrated in FIG. 2A). The beam control system may include one or more nodes communicatively coupled to one or more cell sites (e.g., the cell site 110 (e.g., the aggressor cell site) and/or the cell site 210 (e.g., the victim cell site)). The beam control system may include one or more nodes communicatively coupled to the user device(s) 140 and/or 150 such that the beam control system may transmit to and receive requests and/or data from one or more user devices. The one or more nodes may include a Next Generation Node B (e.g., gNodeB or gNB) or any other suitable node structured to communicatively couple to the user device(s) 140 and/or 150. The one or more nodes may correspond to one or more frequency bands. A frequency is the number of times per second that a radio wave completes a cycle. The frequency band may include a frequency range (e.g., a lower frequency and an upper frequency) within which the user device(s) may connect to the network environment such as, but not limited to, a telecommunication network or a portion thereof. The frequency range may be measured by the wavelength in the range.

In some embodiments, the user device 140 and/or 150 may take the form of a wireless or mobile device capable of communication via the network environment 100. For example, the user device 140 may take the form of a mobile device capable of communication via a telecommunication network such as, but not limited to, a wireless telecommunication network. In this regard, the user device may be any mobile computing device that communicates by way of a network, for example, a 3G, CDMA, 4G, LTE, WiMAX, 5G or any other type of network.

In some embodiments, the network environment 100 may connect subscribers to a service provider or a plurality of service providers. Alternatively or additionally, the network environment 100 may be associated with a specific telecommunication provider that provides services (e.g. 5G, voice, location, etc.) to one or more user devices 140 and/or 150. For example, the user devices 140 and 150 may be subscribers to a telecommunication service provider, in which the user devices 140 and 150 are registered or subscribed to receive voice and data services over the network environment 100. The network environment 100 may include any communication network providing voice and/or data service(s), such as, for example, a 1× circuit voice, a 3G network (e.g., CDMA, CDMA 2000, WCDMA, GSM, UMTS, a 4G network (LTE, WiMAX, HSDPA), or a 5G network.

Having described the network environment 100 and components operating therein, it will be understood by those of ordinary skill in the art that the network environment 100 is but one example of a suitable network and is not intended to limit the scope of use or functionality of aspects described herein. Similarly, the network environment 100 should not be interpreted as imputing any dependency and/or any requirements with regard to each component and combination(s) of components illustrated in FIG. 1. It will be appreciated by those of ordinary skill in the art that the number, interactions, and physical location of components illustrated in FIG. 1 are examples, as other methods, hardware, software, components, and devices for establishing one or more communication links between the various components may be utilized in implementations of the present invention. It will be understood to those of ordinary skill in the art that the components may be connected in various manners, hardwired or wireless, and may use intermediary components that have been omitted or not included in FIG. 1 for simplicity's sake. As such, the absence of components from FIG. 1 should not be interpreted as limiting the present invention to exclude additional components and combination(s) of components. Moreover, though components may be represented as singular components or may be represented in a particular quantity in FIG. 1, it will be appreciated that some aspects may include a plurality of devices and/or components such that FIG. 1 should not be considered as limiting the quantity of any device and/or component.

FIG. 2A is a diagram of the network environment 200 (e.g., a telecommunication network such as, but not limited to, a wireless telecommunication network) including a plurality of cell sites and a beam control system according to an example embodiment. In the present embodiment, the network environment 200 includes the antennas 103 and 203, beams 105 and 205, cell sites 110 and 210, and beam control system 250. Although some of the components in the network environment 200 are depicted as single components (e.g., a single beam control system), in some embodiments, the network environment 200 may include a plurality of such components from 1 to N.

During certain atmospheric conditions 240, one or more layers of the air may form an atmospheric signal guide in the atmosphere (e.g., the troposphere, stratosphere, mesosphere, thermosphere, and/or exosphere). For example, one or more layers (e.g., the layers 220 and 230) of the air may form a waveguide in the troposphere such that an atmospheric condition includes or otherwise forms a tropospheric duct A (e.g., signals may be refracted, scattered, reflected, etc.) between layers 220 and 230. In some examples, the atmospheric condition (e.g., the tropospheric duct or tropospheric ducting) may last for a variable period of time such as, but not limited to, between a few minutes to a plurality of hours.

Figure 2B:
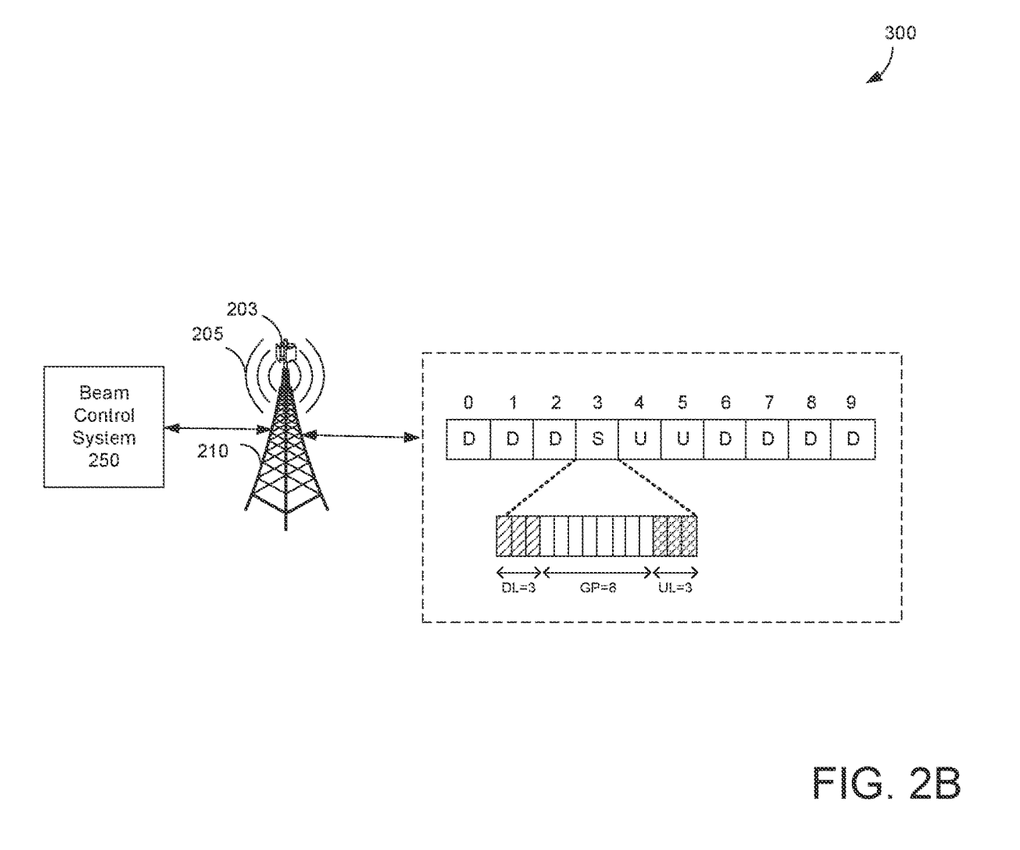
FIG. 2B is a diagram of a network environment including a special slot in accordance with an example embodiment.

One or more directional signals (e.g., the radio signal R) may travel between cell sites (e.g., the cell sites 110, 210) during the atmospheric condition. For example, the directional signal (e.g., the radio signal R) that enters the duct may travel hundreds of kilometers with low propagation losses that may cause interference a distance from the transmitter of the cell site 110 (e.g., the aggressor cell site). The beam control system 250 may determine, via the cell site 210 (e.g., the victim cell site), whether a rise of interference (e.g., interference at the victim cell site) is greater than a threshold during the atmospheric condition. The rise of interference may correspond to at least one of a guard period or one or more uplinks of a special slot. For example, the rise of interference may occur during a guard period and/or an uplink of a special slot such that the beam control system 250 may support interference level measurement during the guard period, the uplink of a special slot (as shown in FIG. 2B), or a combination thereof. In FIG. 2B as illustrated, the special slot, "S," at positon 3 includes 14 symbols. The 14 symbols include 3 symbols for the downlink, "DL," and 3 symbols for the uplink, "UL," that co-exist with a guard period of 8 symbols between them that separate the downlink and the uplink. In some embodiments, the rise of interference may degrade calibration performance, channel reciprocity-based beamforming, or a combination thereof. Calibration causes each antenna phase and amplitude to be in sync. Calibration may occur during the guard period which separates the downlink, "D," and the uplink, "U."

With reference back to FIG. 2A, if the rise of interference is less than the threshold during the atmospheric condition (e.g., the tropospheric duct), the beam control system may reset the calibration signal power level to a default setting. Alternatively or additionally, if the rise of interference is less than the threshold during the atmospheric condition, the beam control system may instruct the user device (e.g., the user device 140) to determine the Sounding Reference Signal (SRS) power based on an open-loop power control. The beam control system 250 may activate one or more time periods (e.g., a waiting period). In further embodiments, the beam control system 250 may again determine whether the rise of interference is greater than the threshold during the atmospheric condition.

In some embodiments, the beam control system may include one or more nodes such that the beam control system (e.g., the beam control system 250) may include or otherwise take the form of a 5G massive MIMO capable gNodeB (e.g., the gNodeB may be communicatively coupled to an antenna structured for massive multiple-input and multiple-output (mMIMO)). The beam control system 250 may be included within a cell site, external to a cell site, or otherwise communicatively coupled to a cell site. The beam control system may manage the signaling (e.g., Orthogonal Frequency-Division Multiplexing (OFDM) signaling) within the network 200. In this regard, the beam control system 250 may allocate radio frequency, radio signals (e.g., the directional signal R) or a portion thereof, to user device(s). In further embodiments, the beam control system 250 may be structured to manage the operation (e.g., the Multiple-Input Multiple-Output (MIMO) operation, massive MIMO operation, etc.) of one or more antennas (e.g., the antenna 203).

The one or more antennas 103 and/or 203 may emit the beam 105 and/or 205 operable in one or more beam modes. As used herein, the term "beam mode" may include a channel reciprocity mode, codebook mode, interference reduction mode, beamsweeping mode, or a combination thereof. In some embodiments, the beam control system 250 may activate a beam mode to selectively communicate with the one or more user devices. The beam control system 250 may prefer the channel reciprocity mode, the code book mode, or any other suitable mode to provide data operations (e.g., techniques) to a served user device (e.g., the user device 140) located in a geographic area that results in higher data rates.

In embodiments wherein the beam mode is based on the channel reciprocity mode (e.g., channel reciprocity beamforming), the band support may take the form of Time Division Duplex (TDD). The user device(s) may provide request(s), data, and/or feedback to the beam control system 250 by an uplink sounding reference signal (UL SRS), uplink demodulation reference signal (UL DMRS), and/or any other suitable signal. In some embodiments, the beam mode (e.g., the channel reciprocity mode) may cause the beam 205 (e.g., the service beam pattern shape) to take the form of an adaptive beam (e.g., a beam derived from or otherwise based on adaptive spatial signal processing) or any other suitable beam. The operation coverage may include channel state information (C SI) coverage. For example, the operation coverage may include UL SRS coverage (e.g., UL SRS transmission).

In embodiments wherein the beam mode is based on the codebook mode (e.g., codebook beamforming), the band support may take the form of TDD, Frequency Division Duplex (FDD), or any other suitable spectrum technique. The user device(s) may provide a request, data, and/or feedback to the beam control system 250 by a channel-state information reference signal (CSI-RS) precoding matrix indicator (PMI) report, or any other suitable signal, indicator, or report. The beam mode (e.g., the codebook mode) may cause the beam 205 (e.g., the service beam pattern shape) to take the form of a 2-D DFT beam (e.g., a beam derived from or otherwise based on a 2D-Discrete Fourier transform) or any other suitable beam. The operation coverage may include channel state information (CSI) coverage based on, for example, the CSI-RS PMI report.

In embodiments wherein the beam mode is based on the beamsweeping mode (e.g., beamsweeping beamforming), the band support may take the form of TDD, FDD, or any other suitable spectrum technique. The user device(s) may provide/request data and/or feedback to the beam control system 250 based on a synchronization signal block beam (SSB) index report, a CSI-RS beam index report, or any other suitable signal, indicator, or report. The beam mode (e.g., the beamsweeping mode) may cause the beam 205 (e.g., the service beam pattern shape) to take the form of a set of pre-defined beams, directional beams, and/or any other suitable beam. The operation coverage may be based on a SSB power measurement and/or SSB power report.

Beamforming may generate or otherwise provide spatially orthogonal (e.g., separated) transmission such that the data stream of a user device may be separate from the data stream of other user device(s) at the receiver of each respective user device. Accordingly, each data stream may be assigned by a separate beam pattern for transmission. In some embodiments, the service beam mapping (e.g., 4×4 MIMO or any other MIMO capable of a plurality of layers of simultaneous data streaming transmission utilizing the same frequency resource(s)) may include a first data stream and a second data stream that may be transmitted by the same beam pattern index (e.g., same beam pattern index 1) with different polarization.

The beam control system 250 may determine, in some embodiments, a power increase status of the directional signal (e.g., a calibration signal, SRS, etc.) if the rise of interference is greater than the threshold. For example, the beam control system 250 may determine if a calibration signal power increase is permitted (e.g., is associated with the active state). In other embodiments, the beam control system 250 may determine if a SRS power increase is permitted. If the power increase status of the directional signal is associated with an inactive state (e.g., the power increase is not permitted), the beam control system 250 may terminate calibration and/or terminate the beam mode (e.g., the channel reciprocity beamforming mode) and, in turn, switch to an alternate beam mode (e.g., the codebook beamforming mode).

In some embodiments, if the power increase status of the directional signal is associated with an inactive state, the beam control system 250 may terminate SRS scheduling and/or terminate the beam mode (e.g., the channel reciprocity beamforming mode) and, in turn, switch to an alternate beam mode (e.g., the codebook beamforming mode).

In some embodiments, the beam control system 250 (e.g., a gNodeB or gNB) may generate a secondary signal power level based on an increase of a first signal power level in response to the power increase status of the directional signal associated with the active state. The first signal power level or the secondary signal power level may include at least one of a calibration signal power level or SRS power level. In some embodiments, the beam control system may be structured to increase the signal power level (e.g., the first signal power level or the secondary signal power level) by at least a portion of a decibel (dB). For example, the beam control system may be structured to increase the calibration signal power level by x-dB. Alternatively or additionally, the beam control system may be structured to cause the user device (e.g., the user device 140) to increase the SRS power level by y-dB.

In some embodiments, the beam control system 250 may determine whether the secondary signal power level (e.g., the increased signal power level) of the directional signal is greater than a target signal power level. For example, the beam control system 250 may determine whether the signal-to-interference-plus-noise ratio (SINR) for the calibration signal is greater than a target SINR. In other examples, the beam control system 250 may determine whether the SINR for the SRS signal is greater than a target SINR.

In some examples, the beam control system 250 may activate one or more time periods if the secondary signal power level of the directional signal is greater than the target signal power level. In response to the activation of the one or more time periods, the beam control system 250 may determine whether the rise of interference is greater than the threshold during the atmospheric condition as described herein above.

If the secondary signal power level of the directional signal is less than the target signal power level, the beam control system 250 may again determine the power increase status of the directional signal as described herein above.

Advantageously, controlling a signal power level of a beam at a cell site of a telecommunications network during an atmospheric condition reduces calibration performance degradation and/or beamforming (e.g., channel reciprocity-based beamforming) performance degradation caused by interference.

Figure 3:
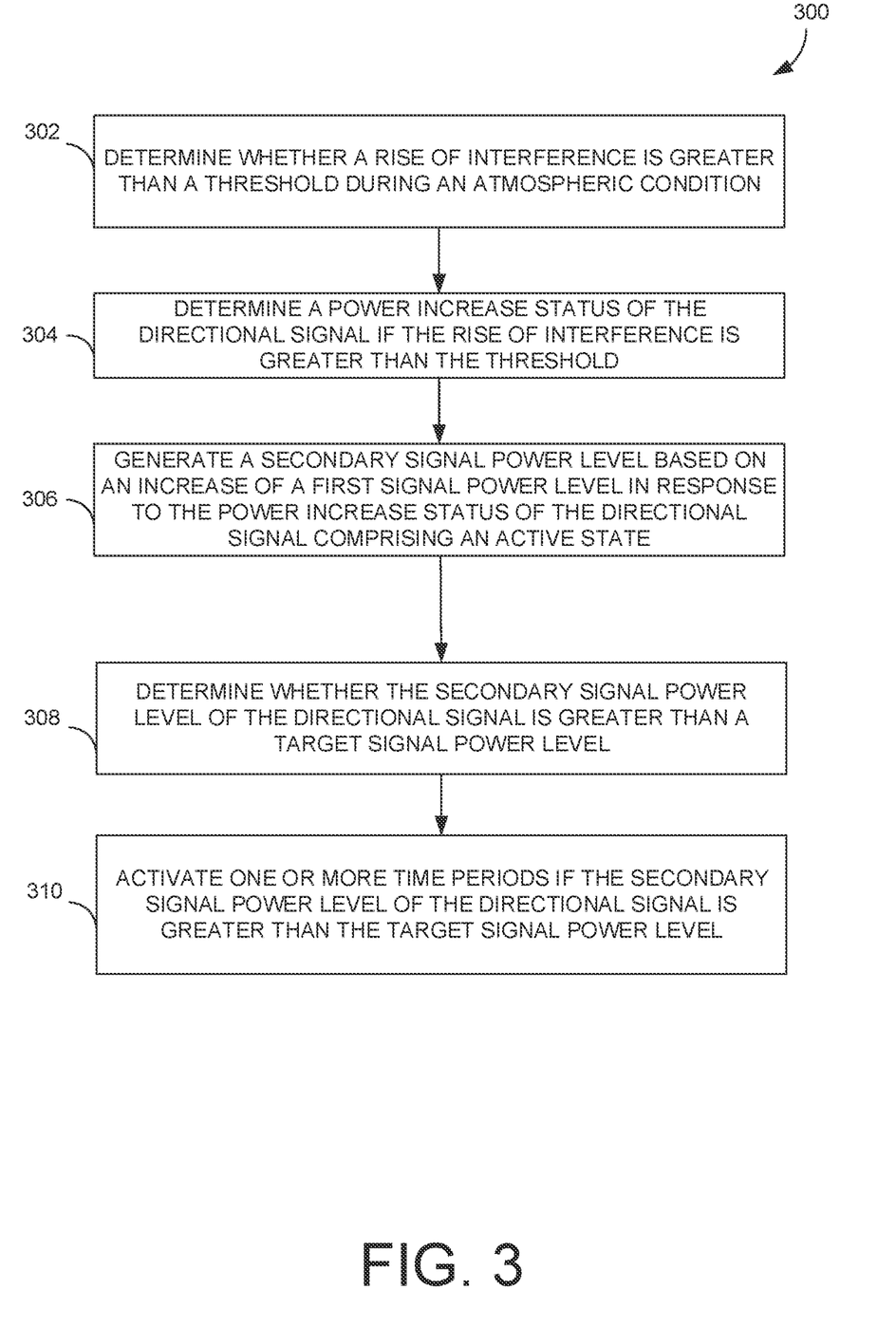
FIG. 3 depicts a flowchart of an exemplary method for controlling a signal power level of a beam at a cell site of a telecommunications network during an atmospheric condition in accordance with an example embodiment.

FIG. 3 depicts a flow diagram of an exemplary method 300 for controlling a signal power level of a beam at a cell site of a telecommunications network during an atmospheric condition, in accordance with implementations of the present disclosure. Initially at block 302 whether a rise of interference is greater than a threshold during an atmospheric condition is determined by a beam control system communicatively coupled to one or more user devices. The rise of interference may correspond to at least one of a guard period or one or more uplinks of a special slot.

At block 304 a power increase status of the directional signal is determined by the beam control system if the rise of interference is greater than the threshold. If the power increase status of the directional signal is associated with an inactive state (e.g., the power increase is not permitted), the beam control system may terminate calibration. In such embodiments, the beam control system may switch to an alternate beam mode (e.g., the codebook beamforming mode).

In some embodiments, a secondary signal power level is generated based on an increase of a first signal power level in response to the power increase status of the directional signal associated with the active state at block 306. In this regard, the beam control system may be structured to increase the signal power level (e.g., the first signal power level or the secondary signal power level) by at least a portion of a decibel (dB).

At block 308, whether the secondary signal power level (e.g., the increased signal power level) of the directional signal is greater than a target signal power level is determined. At block 310, one or more time periods are activated if the secondary signal power level of the directional signal is greater than the target signal power level. In this regard, after the activation of the one or more time periods, the beam control system may determine whether the rise of interference is greater than the threshold during the atmospheric condition as described at block 302.

Figure 4:
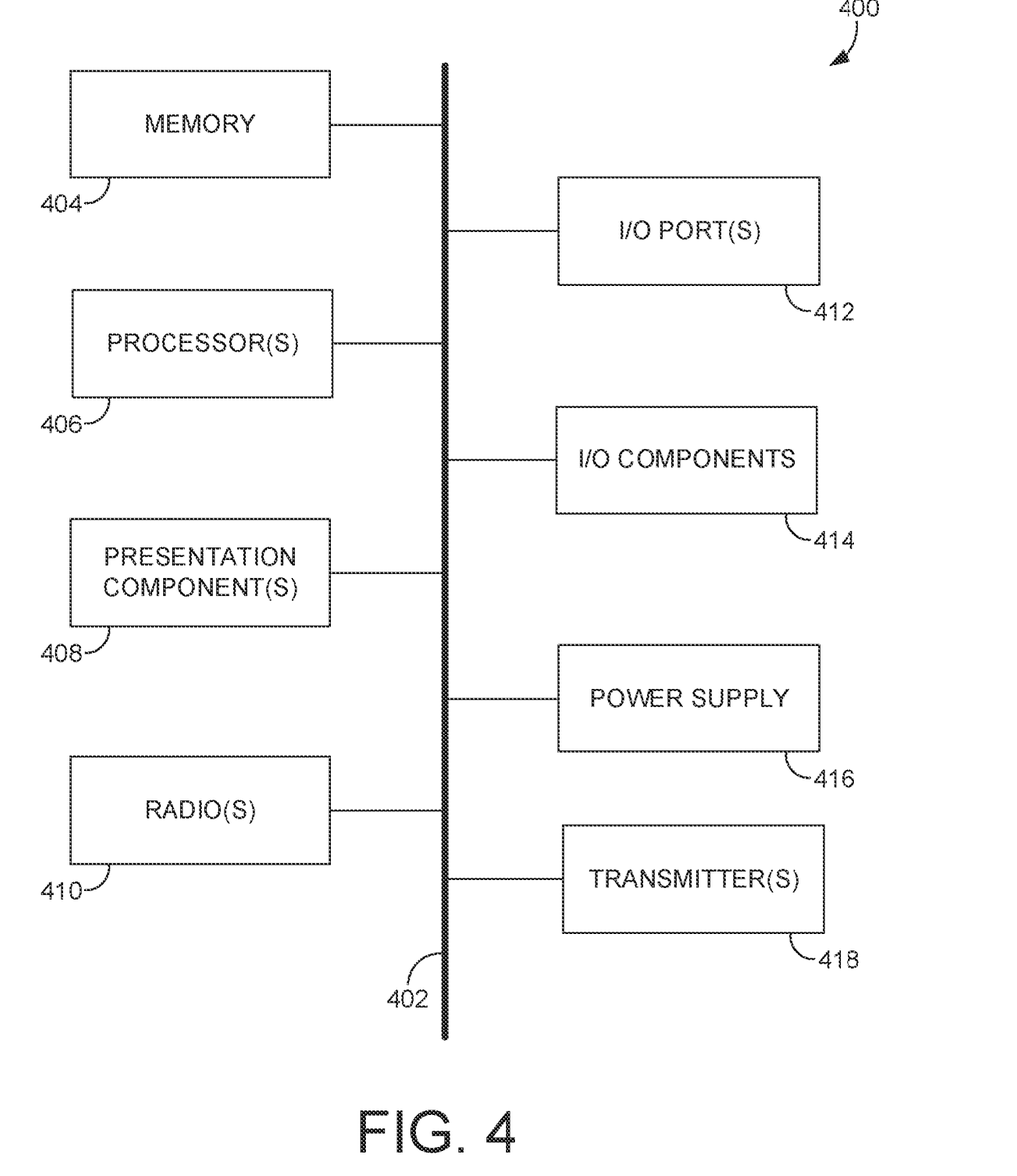
FIG. 4 depicts an exemplary computing device suitable for use in implementations of aspects herein.

Referring to FIG. 4, a block diagram of an example of a computing device 400 suitable for use in implementations of the technology described herein is provided. In particular, the exemplary computer environment is shown and designated generally as computing device 400. Computing device 400 is but one example of a suitable computing environment and is not intended to suggest any limitation as to the scope of use or functionality of the invention. Neither should computing device 400 be interpreted as having any dependency or requirement relating to any one or combination of components illustrated. In aspects, the computing device 400 may be a base station. In another embodiment, the computing device 400 may be UE capable of two-way wireless communications with an access point. Some non-limiting examples of the computing device 400 include a base station, a controller at a base station, a backhaul server, a personal computer, a cell phone, current UE, legacy UE, a tablet, a pager, a personal electronic device, a wearable electronic device, an activity tracker, a laptop, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 4, computing device 400 includes a bus 402 that directly or indirectly couples various components together. The bus 402 may directly or indirectly one or more of memory 404, processor(s) 406, presentation component(s) 408 (if applicable), radio(s) 410, input/output (I/O) port(s) 412, input/output (I/O) component(s) 414, power supply 416, and/or transmitter(s) 418. Although the components of FIG. 4 are shown with lines for the sake of clarity, in reality, delineating various components is not so clear, and metaphorically, the lines would more accurately be grey and fuzzy. For example, one may consider a presentation component(s) 408 such as a display device to be one of I/O components 414. Also, the processor(s) 406 may include memory 404, in another example. The present disclosure hereof recognizes that such is the nature of the art, and reiterates that FIG. 4 is merely illustrative of an example of a computing device 400 that may be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 404 may take the form of memory components described herein. Thus, further elaboration will not be provided here, but it should be noted that memory 404 may include any type of tangible medium that is capable of storing information, such as a database or data store. A database or data store may be any collection of records, files, or information encoded as electronic data and stored in memory 404, for example. In one embodiment, memory 404 may include a set of embodied computer-readable and executable instructions that, when executed, facilitate various functions or elements disclosed herein. These embodied instructions will variously be referred to as "instructions" or an "application" for short.

Processor(s) 406 may be multiple processors that receive instructions and process them accordingly. Presentation component(s) 408, if available, may include a display device, an audio device such as a speaker, and/or other components that may present information through visual (e.g., a display, a screen, a lamp (LED), a graphical user interface (GUI), and/or even lighted keyboards), auditory, and/or other tactile or sensory cues.

Radio(s) 410 represents one or more radios that facilitate communication with a wireless telecommunication network. For example, radio(s) 410 may be connected to one or more antenna elements through a physical path. Illustrative wireless telecommunications technologies include CDMA, GPRS, TDMA, GSM, and the like. Radio(s) 410 might additionally or alternatively facilitate other types of wireless communications including Wi-Fi, WiMAX, 3G, 4G, LTE, mMIMO, 5G, 6G, NR, VoLTE, and/or other VoIP communications. As can be appreciated, in various embodiments, radio(s) 410 may be configured to concurrently support multiple technologies, as previously discussed herein. As such, each of many radio(s) 410 may be used to separately control portions of an antenna array, for example, where at least one portion utilizes a distinct technology relative to another portion in the same antenna array or at the same base station or cell site. A wireless telecommunication network might include an array of devices, which are not shown so as to not obscure more relevant aspects of the invention. Components such as a base station, a communications tower, or even access points (as well as other components) can provide wireless connectivity in some embodiments.

The input/output (I/O) ports 412 may take a variety of forms. Exemplary I/O ports 412 may include a USB jack, a stereo jack, an infrared port, a firewire port, other proprietary communications ports, and the like. Input/output (I/O) components 414 may comprise keyboards, microphones, speakers, touchscreens, and/or any other item usable to directly or indirectly input data into the computing device 400.

Power supply 416 may include batteries, fuel cells, and/or any other component that may act as a power source to supply power to the computing device 400 or to other network components, including through one or more electrical connections or couplings. Power supply 416 may be configured to selectively supply power to different components independently and/or concurrently.

Finally, regarding FIGS. 1 through 4, it will be understood by those of ordinary skill in the art that the environment(s), system(s), and/or methods(s) depicted are not intended to limit the scope of use or functionality of the present embodiments. Similarly, the environment(s), system(s), and/or methods(s) should not be interpreted as imputing any dependency and/or any requirements with regard to each component, each step, and combination(s) of components or step(s) illustrated therein. It will be appreciated by those having ordinary skill in the art that the connections illustrated the figures are contemplated to potentially include methods, hardware, software, and/or other devices for establishing a communications link between the components, devices, systems, and/or entities, as may be utilized in implementation of the present embodiments. As such, the absence of component(s) and/or steps(s) from the figures should be not be interpreted as limiting the present embodiments to exclude additional component(s) and/or combination(s) of components. Moreover, though devices and components in the figures may be represented as singular devices and/or components, it will be appreciated that some embodiments can include a plurality of devices and/or components such that the figures should not be considered as limiting the number of devices and/or components.

It is noted that aspects of the present invention are described herein with reference to block diagrams and flowchart illustrations. However, it should be understood that each block of the block diagrams and/or flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Additionally, as should be appreciated, various embodiments of the present disclosure described herein can also be implemented as methods, apparatus, systems, computing devices/entities, computing entities, and/or the like. As such, embodiments of the present disclosure can take the form of an apparatus, system, computing device, computing entity, and/or the like executing instructions stored on a computer-readable storage medium to perform certain steps or operations. However, embodiments of the present disclosure can also take the form of an entirely hardware embodiment performing certain steps or operations.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned may be completed without departing from the scope of the claims below. Certain features and sub-combinations are of utility and may be employed without reference to other features and sub-combinations and are contemplated within the scope of the claims.

The invention claimed is:

1. A method for controlling a signal power level of a beam at a cell site of a telecommunications network during an atmospheric condition, the method comprising:
    determining, by a beam control system communicatively coupled to one or more user devices, whether a rise of interference is greater than a threshold during an atmospheric condition, wherein a directional signal travels between one or more cell sites during the atmospheric condition;
    determining a power increase status of the directional signal if the rise of interference is greater than the threshold;
    generating a secondary signal power level based on an increase of a first signal power level in response to the power increase status of the directional signal associated with an active state;
    determining whether the secondary signal power level of the directional signal is greater than a target signal power level; and
    activating one or more time periods if the secondary signal power level of the directional signal is greater than the target signal power level.

2. The method of claim 1, wherein the first signal power level or the secondary signal power level comprises at least one of a calibration signal power level or a Sounding Reference Signal (SRS) power level.

3. The method of claim 1, wherein the atmospheric condition comprises a tropospheric duct.

4. The method of claim 1, wherein the beam control system is structured to increase a signal power level by at least a portion of a decibel.

5. The method of claim 1, wherein the rise of interference corresponds to at least one of a guard period or one or more uplinks of a special slot.

6. The method of claim 5, wherein the rise of interference degrades at least one of calibration performance or channel reciprocity-based beamforming.

7. The method of claim 1, wherein the beam control system comprises a gNodeB, and wherein the gNodeB is communicatively coupled to an antenna structured for massive multiple-input and multiple-output (mMIMO).

8. The method of claim 1, wherein the cell site comprises a victim cell site, and wherein cell site comprises the beam control system.

9. Computer-readable storage media having computer-executable instructions embodied thereon that, when executed by one or more processors, cause the processors to:
    determine, by a beam control system communicatively coupled to one or more user devices, whether a rise of interference is greater than a threshold during an atmospheric condition, wherein a directional signal travels between one or more cell sites during the atmospheric condition;
    determine a power increase status of the directional signal if the rise of interference is greater than the threshold;
    generate a secondary signal power level based on an increase of a first signal power level in response to the power increase status of the directional signal associated with an active state, wherein the first signal power level or the secondary signal power level comprises at least one of a calibration signal power level or a Sounding Reference Signal (SRS) power level;

determine whether the secondary signal power level of the directional signal is greater than a target signal power level; and activate one or more time periods if the secondary signal power level of the directional signal is greater than the target signal power level.

10. The computer-readable storage media of claim 9, wherein the atmospheric condition comprises a tropospheric duct.

11. The computer-readable storage media of claim 9, wherein the rise of interference corresponds to at least one of a guard period or one or more uplinks of a special slot.

12. The computer-readable storage media of claim 11, wherein the guard period separates a downlink and an uplink.

13. The computer-readable storage media of claim 9, wherein the beam control system is structured to increase a signal power level by at least a portion of a decibel.

14. The computer-readable storage media of claim 9, wherein the beam control system comprises a gNodeB, and wherein the gNodeB is communicatively coupled to an antenna structured for massive multiple-input and multiple-output (mMIMO).

15. A system for controlling a signal power level of a beam at a cell site of a telecommunications network during an atmospheric condition, the system comprising:
   a user device; and
   a cell site comprising a beam control system communicatively coupled to the user device, the beam control system is structured to:
   determine whether a rise of interference is greater than a threshold during an atmospheric condition, wherein a directional signal travels between one or more cell sites during the atmospheric condition;
   determine a power increase status of the directional signal if the rise of interference is greater than the threshold;
   generate a secondary signal power level based on an increase of a first signal power level in response to the power increase status of the directional signal associated with an active state;
   determine whether the secondary signal power level of the directional signal is greater than a target signal power level; and
   activate one or more time periods if the secondary signal power level of the directional signal is greater than the target signal power level.

16. The system of claim 15, wherein the first signal power level or the secondary signal power level comprises at least one of a calibration signal power level or a Sounding Reference Signal (SRS) power level.

17. The system of claim 15, wherein the atmospheric condition comprises a tropospheric duct.

18. The system of claim 15, wherein the beam control system is structured to increase a signal power level by at least a portion of a decibel.

19. The system of claim 15, wherein the rise of interference corresponds to at least one of a guard period or one or more uplinks of a special slot.

20. The system of claim 15, wherein the rise of interference degrades at least one of calibration performance or channel reciprocity-based beamforming.

\* \* \* \* \*